United States Patent [19]

Brammerlo

[11] 3,956,651
[45] May 11, 1976

[54] WIRE STATOR STRUCTURE
[75] Inventor: Allen A. Brammerlo, Sycamore, Ill.
[73] Assignee: General Electric Company, Fort Wayne, Ind.
[22] Filed: Nov. 5, 1974
[21] Appl. No.: 521,047

[52] U.S. Cl. .............................. 310/218; 310/42; 310/254
[51] Int. Cl.² ......................................... H02K 1/18
[58] Field of Search ................. 310/216–218, 42, 310/43, 254–259; 336/233

[56] References Cited
UNITED STATES PATENTS

| 32,874 | 7/1861 | Jenness | 29/609 |
|---|---|---|---|
| 414,266 | 11/1889 | Thomson | 336/83 |
| 429,583 | 6/1890 | Pfannkuche | 336/60 |
| 781,957 | 2/1905 | Kishi | 310/218 |
| 1,121,859 | 12/1914 | Messiter | 29/191.4 |
| 1,255,607 | 2/1918 | Heusley | 310/217 X |
| 1,296,963 | 3/1919 | Jacobs | 336/177 |
| 2,243,318 | 5/1941 | Rawlings | 310/263 |
| 2,479,656 | 8/1949 | Wiegand | 114/44 |
| 2,774,000 | 12/1956 | Ross | 310/217 X |
| 3,225,235 | 12/1965 | Lee | 310/268 |
| 3,591,819 | 7/1971 | Laing | 310/259 X |

Primary Examiner—Donovan F. Duggan
Attorney, Agent, or Firm—Joseph E. Papin

[57] ABSTRACT

A stator structure for a dynamoelectric machine has a plurality of generally U-shaped segments each terminating in spaced ends and constituted by a plurality of elongate ferromagnetic filaments. The segments are arranged in a generally contiguous relationship to form a magnetic core having discrete polar areas with the spaced ends defining a bore within the magnetic core. At least one winding extends generally about a respective one of the segments between the spaced ends thereof.

16 Claims, 6 Drawing Figures

WIRE STATOR STRUCTURE

CROSS REFERENCE TO RELATED APPLICATIONS

Three related applications are Ser. No. 521,046, Ser. No. 521,044, and Ser. No. 521,045 all being filed Nov. 11, 1974 and all being of Marion W. Sims and assigned to the assignee of the present application. All three of these related applications are incorporated herein by reference.

BACKGROUND OF THE INVENTION

This invention relates generally to dynamoelectric machines and more particularly to stationary members thereof having segments of elongate filamentary material and a method of making such stationary members.

In the past, stationary members, such as a stator or magnetic core for a dynamoelectric machine were conventionally provided with a plurality of relatively thin laminations of sheet magnetic steel in a stack of desired height or length, and a central bore extended through the stack for receiving a rotatable assembly, such as a rotor or the like. These past laminations were conventionally punched from a strip of magnetic steel, and one of the disadvantageous features of punching laminations was that considerable scrap remained as a result of punching the laminations from the strip. Another disadvantageous feature was that complex winding apparatus was required to wind and place windings on such a stationary member since the windings were normally sinusoidally distributed in order to obtain a sinusoidal distribution of air gap flux.

Also in the past, it has been proposed to form the magnetic structure of transformers and electromagnets from generally elongate filamentary material, such as iron wire or the like, but such magnetic structures have not been utilized for a stator of a dynamoelectric machine. It has also been proposed to form the pole pieces of a magneto stator core structure from a plurality of iron wires which are brazed together, but one of the disadvantageous features of such a construction was the inherent holding and brazing of the wires. In addition, in such a construction, the yoke is not made from iron wire.

SUMMARY OF THE INVENTION

Among the several objects of the present invention may be noted the provision of a stationary member for a dynamoelectric machine and method of making such which overcomes the disadvantageous or undesirable features mentioned hereinabove, as well as others, with respect to the prior art; the provision of such stationary member and making method which are generally free of scrap; the provision of such stationary member and making method which utilize segments of generally elongate ferromagnetic filamentary material; and the provision of such stationary member which permits the use of concentrated windings (as opposed to distributed windings). Other objects and advantageous features of the present invention will be in part apparent to those having ordinary skill in the art and in part pointed out hereinafter.

In general, a stationary member in one form of the invention for a dynamoelectric machine has a plurality of generally U-shaped first segments and second segments each terminating in spaced ends and constituted by a plurality of elongate ferromagnetic filaments. The first segments contain more ferromagnetic material than the second segments. The first and second segments are arranged in a generally contiguous relationship to form a magnetic core having discrete polar areas with the spaced ends generally defining a bore within the magnetic core. At least one winding extends generally about a respective one of the first segments and the second segments between the spaced ends thereof.

Also in general and in one form of the invention, a stationary member for a dynamoelectric machine has a plurality of generally U-shaped first and second segments each terminating in spaced ends and constituted by a plurality of elongate ferromagnetic filaments. Each of the first and second segments have a pair of leg portions and another portion connected therebetween with the spaced ends being associated with the leg portions. The leg portions of the second segments are generally contiguous to an adjacent one of the leg portions of the first segments so as to form a magnetic core with the spaced ends generally defining a bore within the magnetic core. At least one winding includes a main winding encircling the other portion of a respective one of the first and second segments and an auxiliary winding encircling the other portion of a respective one of the other of the first and second segments.

Further in general, a stationary member in one form of the invention for a dynamoelectric machine has a plurality of generally U-shaped segments each terminating in spaced ends and constituted by a plurality of elongate ferromagnetic filaments. The segments are arranged in generally contiguous relationship to form a magnetic core having discrete polar areas with the spaced ends generally defining a bore within the magnetic core, and at least one winding extends generally about a respective one of the segments between the spaced ends thereof. The ferromagnetic filaments of the segments forming at least one of the discrete polar areas are distributed in a generally sinusoidal manner to provide a generally sinusoidal distribution of flux produced by the at least one winding upon the energization thereof.

Still in general and in one form of the invention a stationary member for a dynamoelectric machine has a plurality of generally U-shaped segments each formed of a plurality of elongate ferromagnetic filaments and arranged in a generally contiguous relationship to form a magnetic core having discrete polar areas. The segments include a bight portion and a pair of leg portions having a span therebetween and terminating in ends. The segments are arranged with their bight portions generally establishing an outer periphery and with their leg portions extending generally radially inwardly, and the leg portions of adjacent segments are generally contiguous thereby establishing the discrete polar areas with the ends thereof defining a bore. At least a second plurality of segments is provided similar and equal in number to the first named segment plurality, and the leg portions of each of the at least second plurality of segments have a second span shorter than the first named span. Each of the at least second plurality of segments has its bight portion abutting the bight portion of a respective one of the first named segments with its leg portions extending generally radially intermediate the leg portions of the respective one of the first named segments. At least a third plurality of segments is also provided similar and equal in number to the first named and second segment pluralities. Each of the at least third plurality of segments has its leg portions extending generally radially on opposite sides of one of the leg portions of one of the first named segments and respectively being contiguous to the leg portions of adjacent ones of the second segments so as to generally form teeth. The at least third plurality of segments are arranged in a similar manner as the first named segments and the at least second plurality of segments, and the ends of the leg portions of the at least second and the at least third segments also define the bore.

In general, a stationary member in one form of the invention for a dynamoelectric machine has a plurality of segments each having a bight portion with a pair of legs depending therefrom and formed of a plurality of elongate ferromagnetic members. The segments are arranged with their legs in a generally contiguous relationship to form a magnetic core having discrete polar areas, and at least one winding coil is disposed around the bight portion of at least one of the segments. The ferromagnetic members are distributed in a generally sinusoidal manner from one circumferential extremity of at least one discrete polar area to the other extremity thereof to provide a sinusoidal distribution of flux across the at least one polar area when the at least one winding coil is energized.

Also in general, a stationary member in one form of the invention for a dynamoelectric machine has a plurality of generally U-shaped segments each formed of a plurality of elongate ferromagnetic filaments and arranged in a generally contiguous relationship to form a magnetic core having discrete polar areas. The plurality of segments include first segments and second segments each having leg portions and another portion that connects the leg portion. The first segments are arranged with their leg portions extending generally radially to at least partially define a bore. The second segments are arranged so that one leg portion of at least one of the second segments is generally contiguous to an adjacent leg portion of one of the first segments and the other leg portion of the at least one second segment is generally contiguous to one of the leg portions of another of the first segments wherein the second segments define with the first segments the bore. A main winding encircles the other portion of at least one of the first segments, and an auxiliary winding encircles the other portion of at least one of the second segments. The contiguous leg portions generally constitute the discrete polar areas.

Further in general and in one form of the invention, a stationary member for a dynamoelectric machine has first, second and third pluralities of segments with each segment being generally constituted by a bundle of elongate ferromagnetic filaments and having a pair of leg portions terminating at ends with a bight portion integrally connected therebetween, respectively. The first segments are arranged so that adjacent ones of the leg portions thereof are disposed in a generally contiguous relationship forming discrete polar areas in the stationary member and extend generally radially inwardly so that the respective ends thereof define at least a portion of a bore within the stationary member. First and second spans are provided respectively between the leg portions of the first and second segments with the first span being greater than the second span. Each of the second segments has its bight portion and its leg portions disposed generally adjacent those of a respective one of the first segments, and each of the third segments has its leg portions disposed on the opposite sides of the adjacent ones of the leg portions of the first segments and respectively disposed generally contiguously with the leg portions of adjacent ones of the second segments. The respective ends of the second segments and the third segments define with those of the first segments the bore.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner.

DESCRIPTION OF THE PREFERRED EMBODIMENTS

Figure 1:
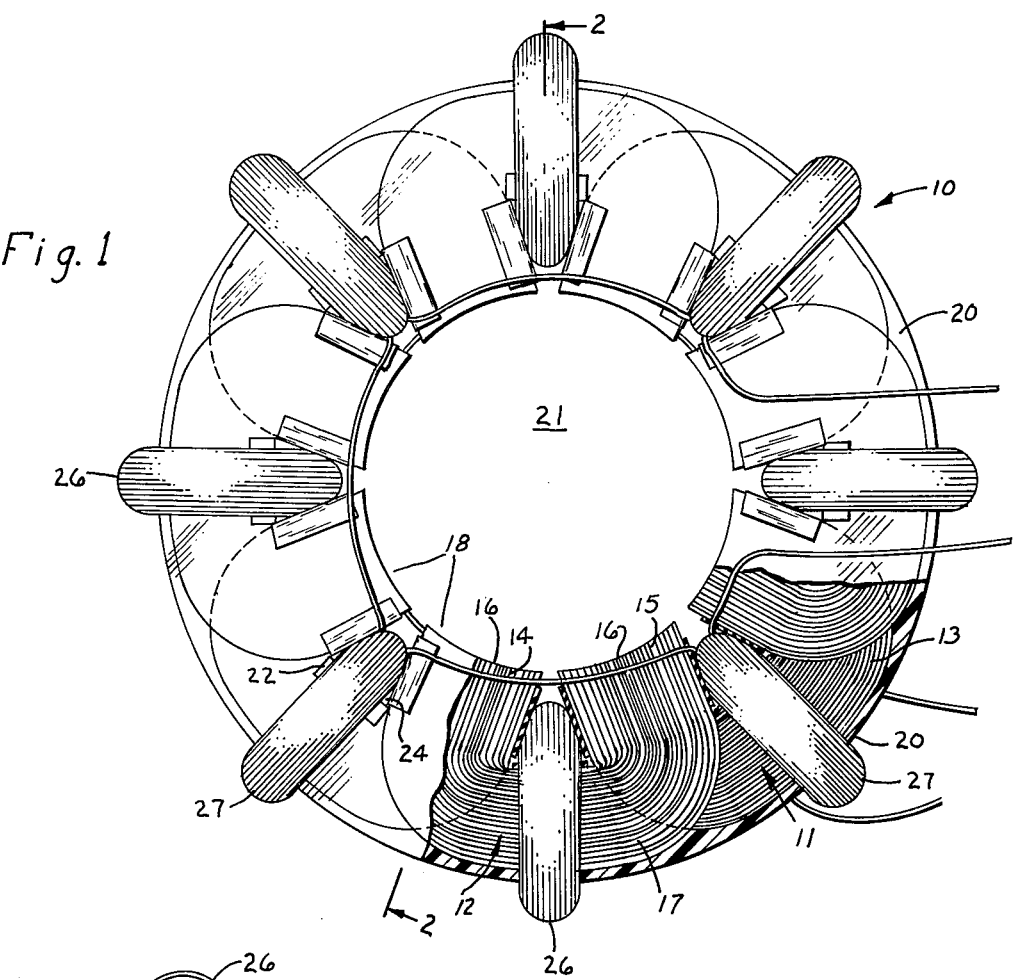
FIG. 1 is an end view, partly broken away, showing a dynamoelectric machine stator member in one form of the invention and which teaches a method for making a dynamoelectric machine also in one form of the invention.
Figure 2:
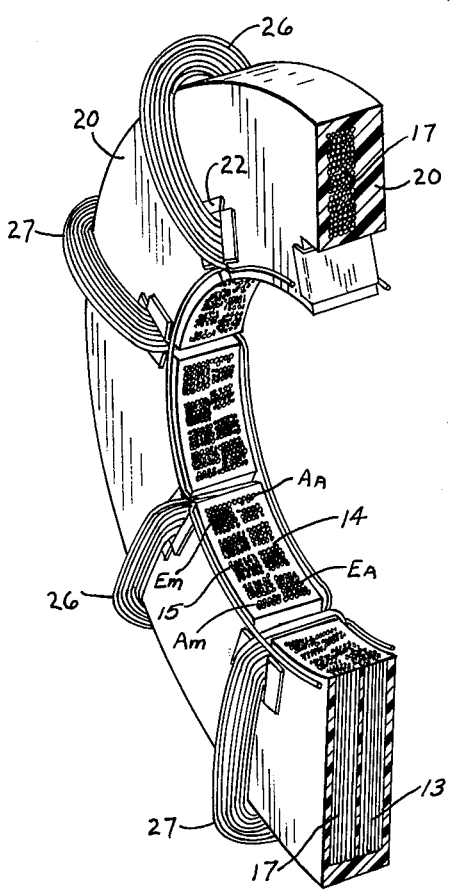
FIG. 2 is a cross-sectional, perspective view taken generally along the line 2—2 of FIG. 1.

Referring now to the drawings in general, a stationary member or assembly, such as a stator core or structure 10, for a dynamoelectric machine is illustrated in one form of the invention (FIGS. 1 and 2). Stator core 10 has a plurality of segments 11, 12, and each of the segments is constituted by generally elongate ferromagnetic filaments or material, such as lengths of iron wire or the like. Segments 11, 12 have a bight portion 13, 17, respectively, and each segment has a pair of leg portions 14, 15. Segments 11, 12 are arranged generally annularly, or in a circle, with segments 12 spaced apart and joined by segments 11 so as to be disposed in a generally contiguous relationship. Thus, one segment 11 has its leg portions 14, 15 in generally contiguous relationship with a leg portion 15 of one segment 12 and a leg portion 14 of an adjacent segment 12 respectively. Contiguous leg portions 14, 15 generally form discrete, spaced apart polar areas 18 in core 10. For example, when windings are placed on the stationary member and electrically energized, magnetic polar regions are created being generally constituted by contiguous leg portions 14, 15, as discussed hereinafter.

Now referring particularly to FIGS. 1 and 2, there is shown a four pole stator structure, generally indicated at 10, in one form of the invention. Stator structure 10 comprises a plurality (eight in the illustrated embodiment) of generally U-shaped segments 11, 12. Each bight portion 13, 17 of segments 11, 12 are respectively integrally interconnected between leg portions 14, 15 thereof which respectively terminate at spaced ends 16. Each of segments 11, 12 is formed of a bundle or grouping of a plurality of elongate filaments of a ferromagnetic material, such as iron or steel wire or strip.

Bight portions 13, 17 of segments 11, 12 are arranged generally on a circle with leg portions 14, 15 extending radially inwardly. Leg portions 14, 15 of adjacent segments 11, 12 are arranged in axially overlapping, abutting or generally contiguous relationship thereby forming discrete polar areas or polar projections 18. The thus-arranged segments 11, 12 are encased and held in assembled relationship by an encapsulating insulation or bonding material 20, but of course it is contemplated that other means or methods for securing the segments together may be utilized within the scope of the invention so as to be generally commensurate with the objects and advantageous features thereof. End 16 of leg portions 14, 15 generally define a cylindrical bore 21 for receiving a rotor member (not shown).

Cuffed insulators 22 are positioned in slots 24 between leg portions 14, 15. In the illustrated embodiment, a plurality of winding or main coils 26 are wound around bight portions 17 while another plurality of windings or auxiliary coils 27 are wound around bight portions 13. It may be noted that concentrated winding coils are utilized thereby simplifying winding equipment and reducing the number of turns because every actual turn is now equal to an effective turn. Shorter length of turns are also utilized because each winding only encircles its own magnetic flux path rather than both paths as is the case in construction of conventional motors. In addition, tooth locking effects are greatly reduced because there are no longer definite teeth and slots.

Figure 3:
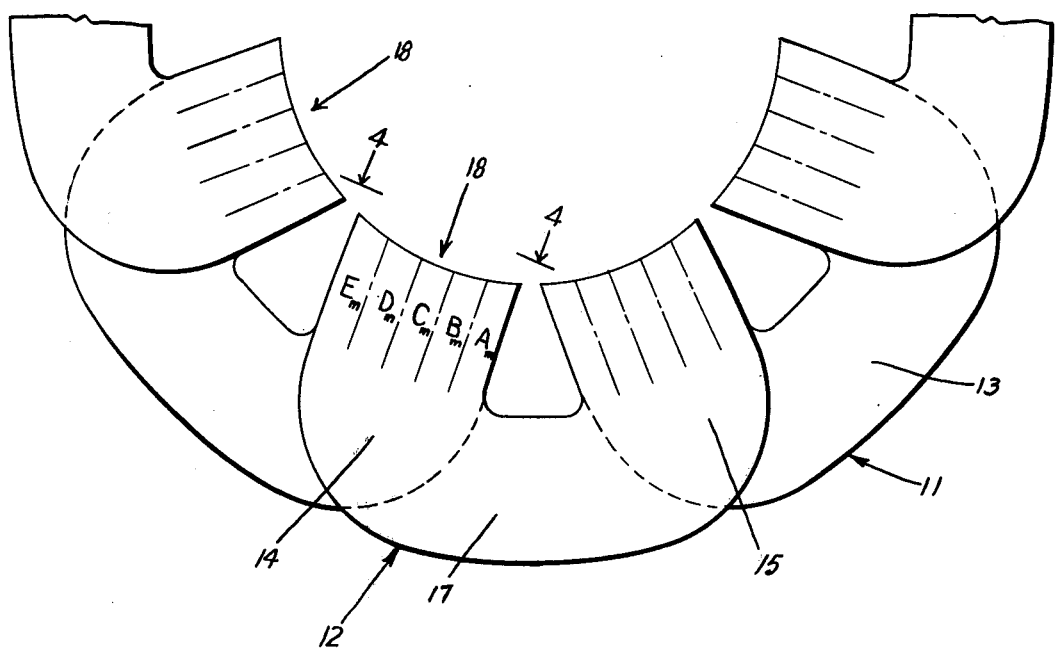
FIG. 3 is a fragmentary view of the stator structure of FIG. 1 showing the distribution of the wires in each magnetic polar projection to obtain sinusoidal flux distribution at the pole faces.
Figure 4:
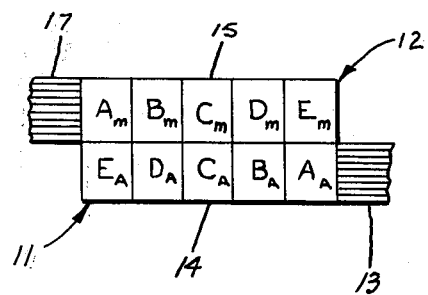
FIG. 4 is an end view of a pole face taken generally along the line 4—4 of FIG. 3.

Referring now to FIGS. 3 and 4, it is desirable to provide a generally sinusoidal distribution of the magnetic flux which emanates from polar projections 18 due to energization of winding coils 26 and 27 (shown in FIG. 1). In order to obtain this objective, there is provided a method whereby the wires in leg portions 14, 15 of segments 11 and 12 are distributed in a generally sinusoidal manner from one circumferential extremity of each leg portion to the other thereof. Thus, in a specific embodiment of the invention, where it was arbitrarily decided to divide a pole into 10 sections or five sections per half pole, having 200 wires in each segment 12 and 133 wires in each segment 11, the wires were distributed in leg portions 14, 15 as follows:

| Section | Percent Total Iron | Number of Wires Main | Number of Wires Auxiliary |
|---|---|---|---|
| A | 4.9% | 10 | 7 |
| B | 14.2% | 28 | 19 |
| C | 22.1% | 44 | 29 |
| D | 27.9% | 56 | 37 |
| E | 30.9% | 62 | 41 |
|   | 100.0% | 200 | 133 |

Each section A, B, C, D, and E represents 18 electrical degrees for a total of 90 electrical degrees or one half pole. Of course, it is contemplated that other distributions may be used in segments 11, 12 within the scope of the invention so as to be generally commensurate with the objects and advantageous features thereof.

In a loaded single phase motor the magnitude of the flux in the start or auxiliary axis is less than that in the main axis, therefore the cross-sectional area of the start axis flux path can be smaller than the cross-sectional area of the main axis. This is illustrated above by using a smaller number of individual wires in the start axis flux path than was used in the main axis flux path. The ratio illustrated was 60/40 for main axis/start axis ratio. In FIG. 4 the segment 12 leg portions is each divided into five sections $A_M$, $B_M$, $C_M$, $D_M$, and $E_M$; while segment 11 leg portions are each divided into five sections $A_A$, $B_A$, $C_A$, $D_A$, and $E_A$. Thus, this method of constructing a stator core structure, provides a sinusoidal distribution of magnetic flux across the stator to rotor air gap by distributing iron content of the stator core in a sinusoidal manner thereby eliminating the requirement of having distributed coil windings to achieve sinusoidal flux distribution. Concentrated coil windings can be used, thus greatly simplifying the winding process and winding apparatus.

It will now be apparent that a unique advantage of the embodiment described hereinbefore is that segments 11, 12 can be placed in a rotatable fixture and their respective coils 26, 27 can be wound directly on the segments, and then the segments may be secured or assembled together to form a scrapless stator core structure 10.

Figure 5:
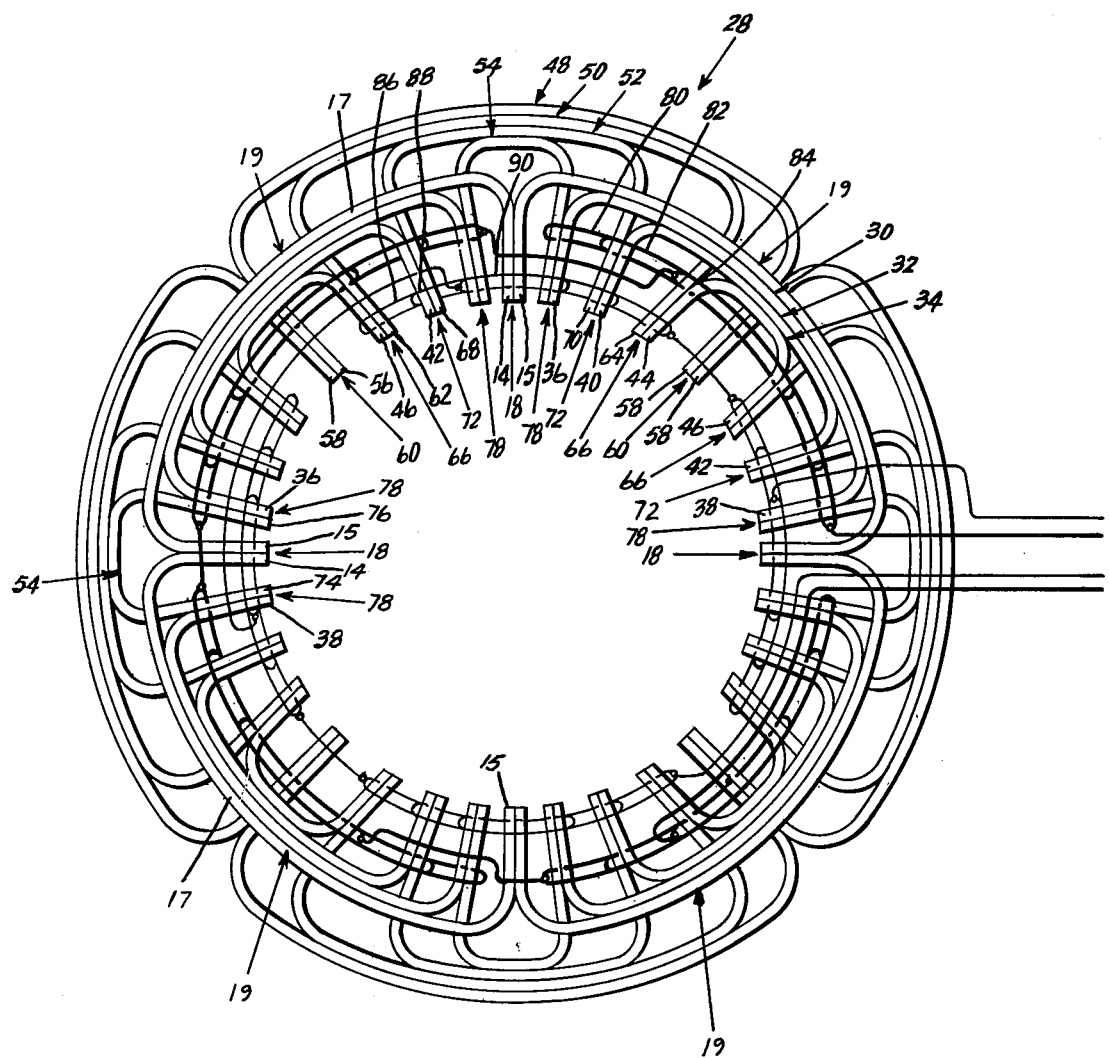
FIG. 5 is a schematic view showing an alternative stationary member for a dynamoelectric machine in one form of the invention and which teaches principles of an alternative method for making a stationary member for a dynamoelectric machine also in one form of the invention.

Referring now to FIG. 5, in which like elements are shown by like reference numerals, there is schematically shown a stator structure 28 for a dynamoelectric machine, such as a four pole, split-phase motor, in one form of the invention. Here, bundles or groupings of wire segments 19 are arranged in a U-shaped manner having bight portions and having leg portions 14, 15 forming polar projections or teeth 18. Additional bundled wire segments 30, 32 and 34 are provided similar and equal in number to segments 19 and having their bight portions respectively contiguous with or adjacent bight portions 17 of segments 19. However, leg portions 36, 38 of segments 30, leg portions 40, 42 of segments 32, and leg portions 44, 46 of segments 34 have progressively shorter spans than the span of leg portions 14, 15 of segments 19.

Additional U-shaped bundled wire segments 48, 50, 52 and 54 are provided similar and equal in number to segments 19, 30, 32 and 34. Leg portions 56, 58 of each segment 48 are arranged in contiguous relationship with the leg portions of adjacent segments 48 to provide polar projections or teeth 60. Leg portions 62, 64 of segments 50 are arranged in contiguous relationship with leg portions 46, 44 of adjacent segments 34 to form polar projections 66. Leg portions 68, 70 of segments 52 are arranged in contiguous relationship with leg portions 42, 40 of adjacent segments 32 to form polar projections or teeth 72, and leg portions 74, 76 of segments 54 are arranged in contiguous relationship with leg portions 38, 36 of segments 30 to form polar projections or teeth 78. It will be seen that projections or teeth 78, 72, 66, 60 are intermediate or between projections 18.

Main or running winding field coil 80 respectively surrounds teeth 78, 72, 66 and 60, main winding field coil 82 respectively surrounds teeth 72, 66 and 60, and main winding field coil 84 respectively surrounds teeth 66 and 60. Auxiliary winding field coil 86 respectively surrounds teeth 66, 72, 78 and 18, starting or auxiliary winding field coil 88 respectively surrounds teeth 72, 78 and 18 and starting or auxiliary winding field coil 90 respectively surrounds teeth 78 and 18.

Figure 6:
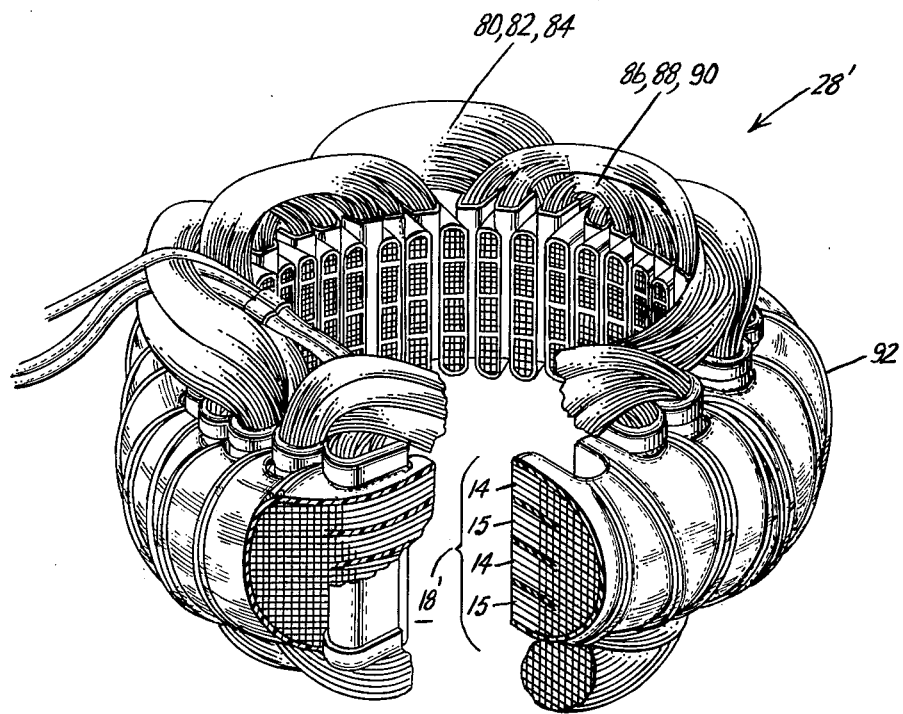
FIG. 6 is a view in perspective, partly broken away and with parts removed, showing a stator structure incorporating the construction shown in FIG. 5.

Referring now to FIG. 6, there is shown a physical embodiment of a stator structure 28' incorporating the structure schematically shown in FIG. 5. Stator structure 28' incorporates two sets of each of the generally U-shaped wire bundled segments 19, 30, 32, 34, 48, 50, 52 and 54 (shown in FIG. 5) so that each polar projection or tooth comprises four wire bundle leg portions. Thus, tooth 18' of stator structure 28' incorporates the two wire bundle leg portions 14 and two wire bundle leg portions 15, as shown. It will be understood that in the physical embodiment of the stator structure 28' shown in FIG. 6, the bight portions of all of the U-shaped wire bundle segments are bundled and tied together, as by banding 92. Further, it will be understood that one or more wire bundles can be used in constructing the stator structure.

In a loaded single phase motor, the magnitude of the flux in the starting winding axis is less than in the main winding axis and therefore the cross-sectional area of the starting axis flux path may be smaller than the cross-sectional area of the main axis flux path. In the embodiment of FIGS. 5 and 6, the cross-sectional area of the starting axis flux path is made smaller by using a smaller number of individual wires in segments 19, 30, 32 and 34 than are used in segments 48, 50, 52 and 54. The actual ratio in a physical embodiment of the stator structure shown in FIG. 6 being a ratio of 60 wires in segments 19, 30, 32, and 34 to 40 wires in segments 48, 50, 52 and 54.

It may now be seen that the wire stator structure in one form of the invention can be formed without scrap, the winding slots result from the generally U-shaped formation of the filamentary ferromagnetic material rather than from being punched as in the case of conventional laminations.

It may further be seen that concentrated winding coils can be employedd in the stationary member illustrated in FIGS. 1 and 2 thereby simplifying winding equipment and reducing the number of turns since every actual turn is equal to an effective turn. Further, shorter turn lengths are provided as each winding only encircles its own magnetic flux path rather than more than one path as in the case of conventional structures. It may also be readily seen that the grain in the magnetic material can be oriented in the direction of flux flow throughout the entire stator structure. Finally, tooth locking effects encountered in conventional motor constructions are greatly reduced since there are no longer definite stator teeth and slots.

It may be appreciated that a stator structure in one form of the invention could be used in multiple phase electric motors as well as single or split-phase motors. Of course, stator structures used in multiple phase motors will have substantially the same amount of ferromagnetic material in each segment. It will also be understood that in permanent-split capacitor motors, the segments accommodating the auxiliary windings could have essentially the same amount of ferromagnetic material as the segments accommodating the main or primary winding, all depending upon the load that the motor is to drive.

From the foregoing, it is now apparent that novel stationary members 10, 28 and novel methods of making a stationary member for a dynamoelectric machine are disclosed meeting the objects and advantageous features set forth herein, as well as others. It is also contemplated that changes as to the precise configurations, shapes, details and connections of the components illustrated herein for the purpose of disclosure, as well as to the precise steps of the disclosed making methods, may be made by those having ordinary skill without departing from the spirit of the invention or the scope thereof as defined by the claims which follow.

What I claim as new and desire to secure by Letters Patent of the United States is:

1. A stationary member for a dynamoelectric machine comprising a plurality of generally U-shaped first segments and second segments each terminating in spaced ends and constituted by a plurality of elongate ferromagnetic filaments and wherein the first segments contain more ferromagnetic material than the second segments, the first segments and second segments being arranged in a generally contiguous relationship to form a magnetic core having discrete polar areas with the spaced ends generally defining a bore within the magnetic core, and at least one winding extending generally about a respective one of the first segments and the second segments between the spaced ends thereof.

2. A stationary member as set forth in claim 1 wherein the ferromagnetic filaments are iron wire.

3. A stationary member as set forth in claim 2 wherein the grain of the iron wire is oriented in the direction of flow of the magnetic flux path.

4. A stationary member as set forth in claim 2 wherein each of the first and second segments comprises a bundle of iron wire.

5. A stationary member as set forth in claim 1 wherein the first segments and second segments each have a pair of leg portions and another portion that connects the leg portions, the spaced ends being associated with the leg portions, the at least one winding extending generally about the other portion of the respective one of the first segments and the second segments, the first segments and second segments being arranged with their leg portions extending generally toward the bore, and the leg portions of the second segments being generally contiguous to an adjacent one of the leg portions of the first segments thereby to generally define the discrete polar areas.

6. A stationary member as set forth in claim 1 wherein each of the first and second segments have a bight portion and a pair of spaced apart leg portions respectively terminating at the spaced ends, the first and second segments being arranged with their bight portions generally establishing an outer periphery of the magnetic core and with the leg portions extending generally toward the bore, the leg portions of adjacent ones of the first and second segments being generally contiguous thereby to establish the discrete polar areas, and the at least one winding being disposed about the bight portion of the respective one of the first and second segments.

7. A stationary member for a dynamoelectric machine comprising a plurality of generally U-shaped first and second segments each terminating in spaced ends and constituted by a plurality of elongate ferromagnetic filaments, each of the first and second segments having a pair of leg portions and another portion connected therebetween with the spaced ends being associated with the leg portions, the leg portions of the second segments being generally contiguous to an adjacent one of the leg portions of the first segments so as to form a magnetic core having discrete polar areas with the spaced ends generally defining a bore within the magnetic core, a main winding encircling the other portion of a respective one of the first and second segments, and an auxiliary winding encircling the other portion of a respective one of the other of the first and second segments.

8. A stationary member for a dynamoelectric machine comprising a plurality of generally U-shaped segments each terminating in spaced ends and constituted by a plurality of elongate ferromagnetic filaments, the segments being arranged in generally contiguous relationship to form a magnetic core having discrete polar areas with the spaced ends generally defining a bore within the magnetic core, at least one winding extending generally about a respective one of the segments between the spaced ends thereof, and wherein the ferromagnetic filaments of the segments forming at least one of the discrete polar areas ar distributed in a generally sinusoidal manner thereby to provide a generally sinusoidal distribution of flux produced by the at least one winding upon the energization thereof.

9. A stationary member for a dynamoelectric machine comprising a plurality of generally U-shaped segments each formed of a plurality of elongate ferromagnetic filaments and arranged in a generally contiguous relationship to form a magnetic core having discrete polar areas, the segments including a bight portion, and a pair of leg portions having a span therebetween and terminating in ends, the segments being arranged with their bight portions generally establishing an outer periphery and with their leg portions extending generally radially inwardly, the leg portions of adjacent segments being generally contiguous thereby establishing the discrete polar areas with the ends thereof defining a bore, at least a second plurality of segments similar and equal in number to the first named segment plurality, the leg portions of each of the at least second plurality of segments having a second span shorter than the first named span, each of the at least second plurality of segments having its bight portion abutting the bight portion of a respective one of the first named segments with its leg portions extending generally radially intermediate the leg portions of said respective one of the first named segments, and at least a third plurality of segments similar and equal in number to said first named and second segment pluralities, each of the at least third plurality of segments having its leg portions extending generally radially on opposite sides of one of the leg portions of one of the first named segments and respectively being contiguous to the leg portions of adjacent ones of the second segments so as to generally form teeth, the at least third plurality of segments being arranged in a similar manner as the first named segments and the at least second plurality of segments, and the ends of the leg portions of the at least second and the at least third segments also defining the bore.

10. A stationary member set forth in claim 9 wherein the bight portions of said at least third segments are contiguous to parts of the bight portions of two different ones of the first named segments.

11. A stationary member set forth in claim 9 further comprising at least a first main winding coil embracing the teeth formed by the leg portions spanned by one of the segments having a first span, and at least a second coil concentric about a leg portion of one of the segments having a first span.

12. A stationary member set forth in claim 9 wherein the at least third segments have fewer ferromagnetic filaments than the first named and the at least second segments.

13. A stationary member set forth in claim 9 wherein the ferromagnetic filaments of the leg portions of at least one segment are distributed therein from one circumferential extremity thereof to the other in a generally sinusoidal manner thereby to provide a sinusoidal distribution of magnetic flux.

14. A stationary member for a dynamoelectric machine comprising a plurality of segments each having a bight portion with a pair of legs depending therefrom and formed of a plurality of elongate ferromagnetic members, the segments being arranged with their legs in a generally contiguous relationship to form a magnetic core having discrete polar areas, at least one winding coil disposed around the bight portion of at least one of the segments, the ferromagnetic members being distributed in a generally sinusoidal manner from one circumferential extremity of at least one discrete polar area to the other extremity thereof to provide a sinusoidal distribution of flux across the at least one polar area when the at least one winding coil is energized.

15. A stationary member for a dynamoelectric machine comprising a plurality of generally U-shaped segments each formed of a plurality of elongate ferromagnetic filaments and arranged in a generally contiguous relationship to form a magnetic core having discrete polar areas, the plurality of segments including first segments and second segments each having leg portions and another portion that connects the leg portion, the first segments being arranged with their leg portions extending generally radially to at least partially define a bore, and the second segments being arranged so that one leg portion of at least one of the second segments is generally contiguous to an adjacent leg portion of one of the first segments and the other leg portion of the at least one second segment is generally contiguous to one of the leg portions of another of the first segments wherein the second segments define with the first segments the bore, and a main winding encircling the other portion of at least one of the first segments and an auxiliary winding encircling the other portion of at least one of the second segments, the contiguous leg portions generally constituting the discrete polar areas.

16. A stationary member for a dynamoelectric machine comprising first, second and third pluralities of segments with each segment being generally constituted by a bundle of elongate ferromagnetic filaments and having a pair of leg portions terminating at ends with a bight portion integrally connected therebetween, respectively, the first segments being arranged so that adjacent ones of the leg portions thereof are disposed in a generally contiguous relationship forming discrete polar areas in the stationary member and extend generally radially inwardly so that the respective ends thereof define at least a portion of a bore within the stationary member, first and second spans respectively between the leg portions of the first and second segments with the first span being greater than the second span, each of the second segments having its bight portion and its leg portions disposed generally adjacent those of a respective one of the first segments, each of the third segments having its leg portions disposed on the opposite sides of the adjacent ones of the leg portions of the first segments and respectively disposed generally contiguously with the leg portions of adjacent ones of the second segments, and the respective ends of the second segments and the third segments defining with those of the first segments the bore.

* * * * *